United States Patent
Hahn

(10) Patent No.: US 7,083,216 B2
(45) Date of Patent: Aug. 1, 2006

(54) PIVOTABLE VEHICLE TRUNK LID

(75) Inventor: Gerald Hahn, Wistedt (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 25 days.

(21) Appl. No.: 10/805,658

(22) Filed: Mar. 20, 2004

(65) Prior Publication Data

US 2004/0178654 A1    Sep. 16, 2004

Related U.S. Application Data

(63) Continuation-in-part of application No. PCT/EP03/06970, filed on Jul. 1, 2003.

(30) Foreign Application Priority Data

Jul. 17, 2002    (DE) ................ 102 32 468

(51) Int. Cl.
*B62D 25/12*    (2006.01)
(52) U.S. Cl. ................... 296/76; 296/146.8
(58) Field of Classification Search .......... 296/76, 296/136.05, 136.06, 107.08, 146.8; 49/386, 49/397, 348, 349, 358
See application file for complete search history.

(56) References Cited

U.S. PATENT DOCUMENTS

| | | | |
|---|---|---|---|
| 6,520,557 B1 * | 2/2003 | Benthaus et al. | 296/76 |
| 6,902,219 B1 * | 6/2005 | Hess et al. | 296/76 |

FOREIGN PATENT DOCUMENTS

| | | |
|---|---|---|
| DE | 195 25 587 | 9/1996 |
| DE | 196 46 035 | 5/1998 |
| DE | 199 43 582 | 3/2001 |
| DE | 198 46 006 | 4/2001 |
| DE | 199 49 960 | 4/2001 |
| DE | 199 10 763 | 7/2001 |
| DE | 101 07 079 | 8/2002 |
| DE | 101 35 581 | 1/2003 |
| EP | 0 846 584 | 6/1998 |

* cited by examiner

*Primary Examiner*—Joseh D. Pape
(74) *Attorney, Agent, or Firm*—Klaus J. Bach

(57) ABSTRACT

In a pivotable vehicle lid support arrangement including an operating linkage, an operating member for opening and closing the lid and a drive unit for actuating the operating member, the operating linkage and the operating member are mounted with an end to a console and with their other ends to the vehicle lid, to which also the drive unit is mounted so as to form, together with the lid, a preassembled installation module and the operating arms of the linkage and the operating member are so arranged that they are disposed adjacent to, and essentially in parallel alignment with, the lid when the lid is in a closed position.

4 Claims, 2 Drawing Sheets

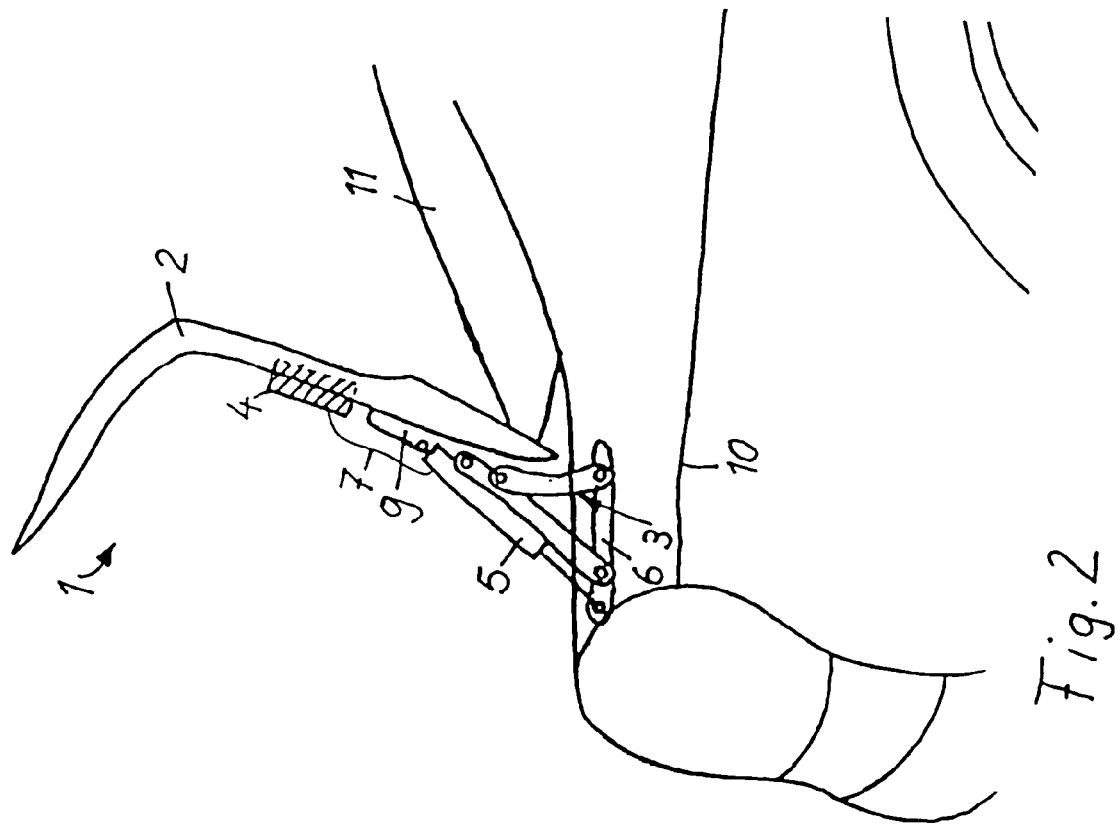
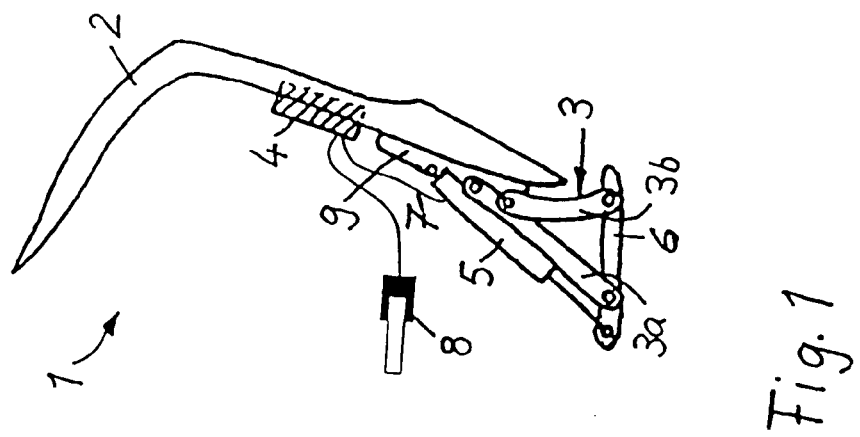

PIVOTABLE VEHICLE TRUNK LID

This is a Continuation-In-Part Application of International Application PCT/EP03/06970 filed July 1, 2003 and claiming the priority of German application 102 32 468.9 filed Jul. 17, 2002.

BACKGROUND OF THE INVENTION

The invention relates to a pivotable vehicle trunk lid, which is mounted to a vehicle body by an operating mechanism including a lid-mounted drive unit for operating the lid and the operating mechanism is in the form of a pre-assembled module.

DE 196 43 225 C1 discloses a removable vehicle roof having a pre-assembled module including a roof, a roll-over bar and a roof storage compartment in which the roof is deposited in its open position. The roof storage compartment is provided with a cover which is supported on a carrier which forms the support structure for the whole module that is installed in the vehicle as a preassembled unit.

Storage compartment covers used in convertible vehicles generally include a controllable operating mechanism for automatically lowering and raising the vehicle roof and for opening and closing a storage compartment cover in synchronism with the movement of the roof.

EP 0 846 584 A1 discloses a roof storage compartment cover which is pivotally supported on a vehicle body and which can be opened and closed by a drive mechanism comprising a drive motor with a rack and pinion drive by way of which the movement of the motor is transferred to the operating linkage for the storage compartment cover. The drive motor is supported on the vehicle body in an area ahead of the storage compartment near the vehicle interior and the rack and pinion drive extends from the centrally arranged motor to the operating linkages at opposite sides of the compartment cover.

The roof storage compartment cover and the operating mechanism for the compartment cover disclosed in EP 0 846 584 A1 however are not suitable for forming a pre-assembled modular unit. In the arrangement of EP 0 846 584, the drive and operating mechanism must be mounted directly to the vehicle body.

DE 199 43 582 A1 discloses a pivotable trunk lid for a convertible vehicle which covers a roof storage compartment behind the vehicle interior and a trunk directly behind the roof storage compartment. The trunk lid can be raised by way of a suitable operating mechanism at its rear end for loading and unloading luggage and at its front end for providing a passage permitting the transfer of the vehicle roof into the storage compartment. The trunk lid is operated by way of a hydraulic operating member, which is connected to the trunk lid together with an operating mechanism in the form of a multilink arrangement. The hydraulic operating member is supported on a console which is also connected to the trunk lid. The console, the hydraulic operating member, the operating mechanism and the rear lid form a pre-assembled unit which can be installed in a vehicle using only a few bolts or nuts.

With the trunk lid closed, the support console as well as the hydraulic operating member extend downwardly into the roof storage compartment area or, respectively, the trunk and therefore require a relatively large installation space.

It is the object of the present invention to provide a pivotable cover or lid for a vehicle in such a way that it can be rapidly installed in a vehicle and is operable with high reliability and the installation space for accommodating the operating mechanism and the operating member of the pivotable cover or lid is relatively small.

SUMMARY OF THE INVENTION

In a pivotable vehicle lid support arrangement including an operating linkage, an operating member for opening and closing the lid and a drive unit for actuating the operating member, the operating linkage and the operating member are mounted with one end to a console and with their other ends to the vehicle lid, to which also the drive unit is mounted so as to form, together with the lid, a preassembled installation module and the operating arms of the linkage and the operating member are so arranged that they are disposed adjacent to, and essentially in parallel alignment with, the lid when the lid is in a closed position.

With the arrangement according to the invention, the complete lid operating mechanism is mounted to the trunk lid forming a pre-assembled unit, which can be tested for operation before it is installed in a vehicle. The operating mechanism and the drive member are all disposed closely adjacent to, and extend along, the trunk lid when the trunk lid is closed so that very little space is required for the accommodation of these components.

As a result, malfunctions can be detected before the installation in the vehicle so that any problems can be attended to before the lid is installed and the vehicle assembly is not disturbed by the need for correcting any problems with the trunk lid operating mechanism. Furthermore, because of the short distance between the drive member and the operating linkage, the operating energy must be transmitted only over a short distance so that the structure subjected to operating forces is quite small. Since the drive member and the operating mechanism is disposed on the underside of the lid—with respect to the installation conditions for the lid, also the components needed for operating the lid are disposed on the same side of the lid so that no holes need to be drilled through the lid or in water channel area around the edges of the lid and no water seals are needed and leakages are prevented.

The arrangement according to the invention provides for a compact operating unit, which, for connection to the electrical system of the vehicle, only needs to be plugged in and which can be mounted to the vehicle body by way of only a few predetermined mounting points.

In a preferred embodiment of the invention, the drive unit and the operating member are hydraulic elements. As drive unit, a hydraulic pump is used. The operating member is a hydraulic cylinder to which hydraulic oil is supplied from the hydraulic pump in accordance with the desired actuating movement. The hydraulic pump is electrically operated. The electric power and the control are provided by the electric and the control systems of the vehicle.

In another advantageous embodiment of the invention, the drive unit is an electric motor. The operating member is a drive shaft which acts on the operating linkage so as to transfer the movement of the motor to the operating linkages. The drive shaft is particularly connected to a pivot joint of the operating linkage at the lid. But it may be expedient to connect the rotor of the electric motor directly to the pivot joint of the operating linkage. In this latter arrangement, the rotor of the electric motor takes on the function of a pivot shaft of the operating linkage.

In both embodiments the hydraulic as well as the electric operating members—the drive units—are controlled by the vehicle control system which controls the drive unit by central signals representing the drivers wishes. For example, if the lid is a trunk lid or a storage compartment cover the control signals depend on the desired operation for the adjustment of a vehicle roof between the closed and open positions or an actuation of the power assisted opening and closing of the trunk lid providing access to the trunk.

In an expedient further embodiment, the operating linkage and the operating member are supported at their end remote from the lid by a console which is part of the installation module. In principle, it is sufficient to connect the installation module including the lid exclusively by way of the console to a vehicle body component, particularly, to the vehicle body. Other connecting points between the vehicle and the installation module are not needed.

Further advantages and suitable embodiments of the invention will be described below on the basis of the accompanying drawing.

BRIEF DESCRIPTION OF THE DRAWINGS

FIG. 1 shows a pivotable lid for a vehicle with an operating unit including an operating member and an operating linkage as a pre-assembled installation module, FIG. 2 shows the lid as a trunk lid installed in a vehicle in an open position.

DESCRIPTION OF A PARTICULAR EMBODIMENT

Figure 3:
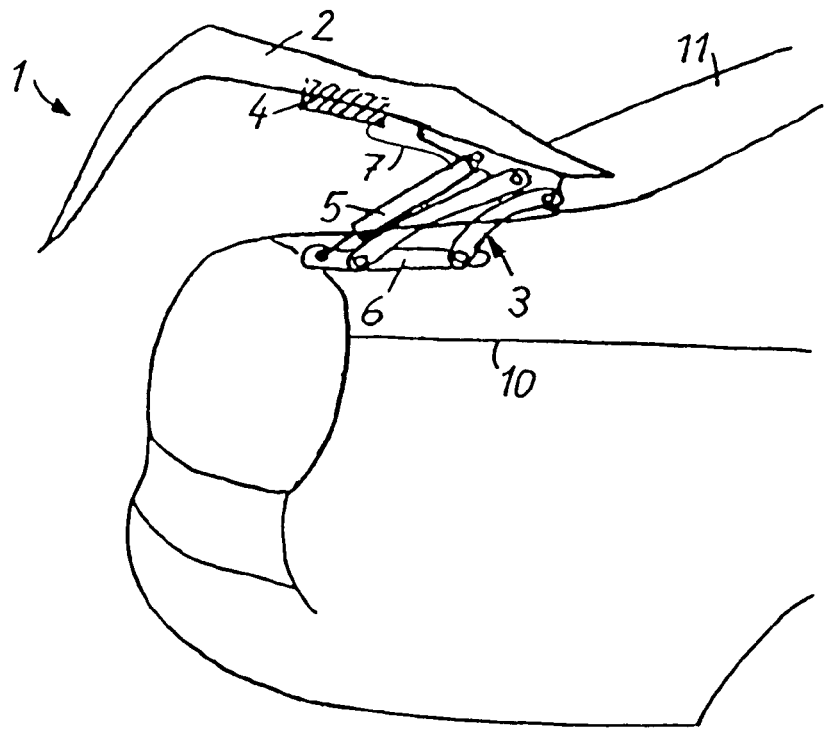
FIG. 3 shows the trunk lid in an intermediate position between the open and closed positions.

As shown in FIG. 1, the pre-assembled installation module 1, which forms an assembly unit comprises a lid 2, an operating linkage 3, a drive structure consisting of a hydraulic pump 4 and an operating member in the form of a hydraulic cylinder 5 and a console 6, on which the operating linkage 3 and the hydraulic cylinder 5 are supported.

The hydraulic pump is mounted to the underside of the lid 2 and supplies hydraulic operating fluid to the hydraulic cylinder 5 by way of hydraulic lines 7. The hydraulic cylinder 5 is pivotally supported at one end by the console 6 and its other end is connected to a flange 9, which is part of the lid 2 or is firmly connected thereto. The operating linkage 3 is in the form of a four-link mechanism and comprises two individual arms 3a and 3b, which at one of their ends are also pivotally connected to the console 6 and with their other ends are pivotally connected to the flange 9 of the lid 2. The hydraulic pump 4 is connected to an electrical supply cable by a plug-in connection 8. When the unit is installed the plug 8 is connected to the power supply system of the vehicle and the power supplied to the electric motor can be controlled by the control unit of the vehicle.

Alternatively to a hydraulic drive unit and a hydraulic operating member an electric motor may be provided as a drive unit. The electric motor has a drive shaft which operates the operating linkage.

FIG. 2 shows the installation module 1 mounted in a vehicle. The lid 2 is a trunk lid. The whole module is connected to the vehicle body 10 mechanically only by way of the console 6, specifically it is bolted or screwed to the vehicle body 10. The lid 2 may at the same time have the function of a cover for a storage compartment of a roof which can be deposited in the rear roof storage compartment. FIG. 2 shows also a rear view window 11 of a car which is expediently integrated into the vehicle roof and is deposited together with the vehicle roof.

FIG. 3 shows the lid 2 in an intermediate position between the open and the closed positions. The hydraulic cylinder 5 is moved by the actuation of the hydraulic pump 4 into a halfway retracted position, whereby the operating linkage is caused to perform a lid closing movement. The hydraulic cylinder 5 is disposed—in the longitudinal direction of the vehicle—adjacent to the rear end of the vehicle behind the individual arms of the operating linkage 3.

Figure 4:
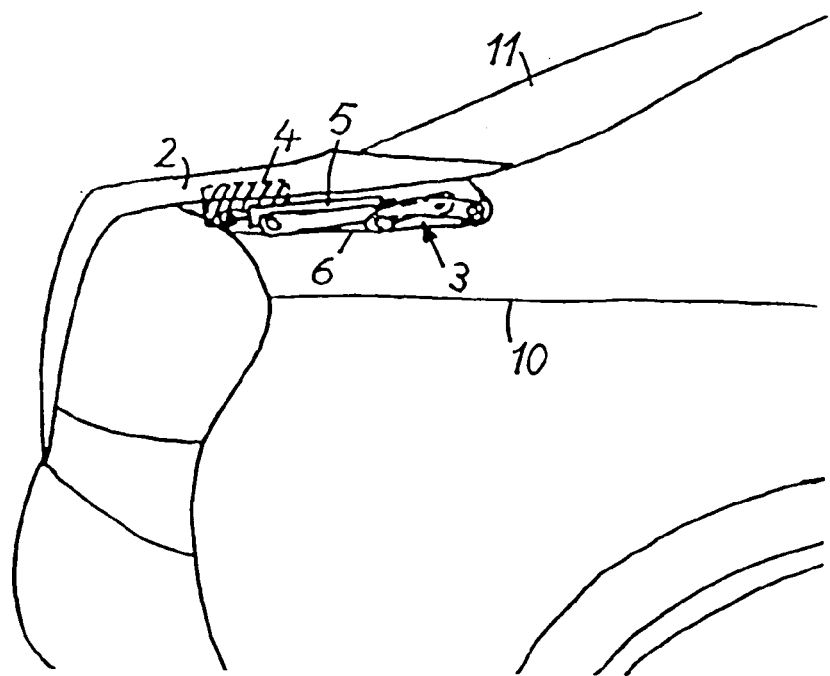
FIG. 4 shows the trunk lid in a closed position.

In the closed position of the lid 2 as shown in FIG. 4, the individual arms of the operating linkage 3 and also the hydraulic cylinder 5 are in a position in which they extend about parallel to the lid 2 and to the console 6. The pivotable lid may of course also be used in connection with convertible rag-top vehicles.

What is claimed is:

1. A pivotally supported lid for a vehicle having an operating linkage (3) including two operating arms (3a, 3b) pivotally supporting the lid (2) on a vehicle body (10) so as to be movable between a closed and an open position, an operating member (5) connected to said lid (2) for opening and closing said lid (2) and a drive unit (4) supported on said lid (2) and connected to said operating member (5) for actuating said lid (2), said operating linkage (3) and said operating member (5) and said drive unit being mounted on a console (6) so as to form, together with said lid (2), a preassembled installation module (1) wherein said operating arms (3a, 3b) of said linkage 3 and said operating member (5) are disposed adjacent to, and essentially in parallel alignment with, said lid (2) when said lid (2) is in a closed position.

2. A pivotally supported lid according to claim 1, wherein said drive unit (4) and said operating member (5) are hydraulically operable.

3. A pivotally supported lid according to claim 1, wherein said lid (2) is a rear trunk lid.

4. A pivotally supported lid according to claim 1, wherein said lid (2) is a cover for closing a rear storage compartment of a removable vehicle roof.

\* \* \* \* \*